United States Patent
Sim (10) Patent No.: US 8,982,075 B2
(45) Date of Patent: Mar. 17, 2015

(54) ELECTRONIC APPARATUS AND OPERATING METHOD THEREOF

(75) Inventor: Sang Hyun Sim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 121 days.

(21) Appl. No.: 13/597,565

(22) Filed: Aug. 29, 2012

(65) Prior Publication Data

US 2013/0321291 A1  Dec. 5, 2013

(30) Foreign Application Priority Data

May 30, 2012  (KR) .................. 10-2012-0057386

(51) Int. Cl.
*G06F 3/041* (2006.01)
*G06F 3/048* (2013.01)

(52) U.S. Cl.
CPC ..................... *G06F 3/048* (2013.01)
USPC ........................................................ 345/173

(58) Field of Classification Search
CPC .......................... G06F 3/02; G06F 3/41–3/048
USPC ........................................................ 345/173
See application file for complete search history.

(56) References Cited

U.S. PATENT DOCUMENTS

| | | | |
|---|---|---|---|
| 2003/0105983 A1* | 6/2003 | Brakmo et al. | 713/320 |
| 2008/0211783 A1 | 9/2008 | Hotelling et al. | |
| 2009/0109173 A1* | 4/2009 | Fu | 345/156 |
| 2009/0187676 A1* | 7/2009 | Griffin et al. | 710/14 |
| 2009/0189867 A1* | 7/2009 | Krah et al. | 345/173 |
| 2010/0079794 A1* | 4/2010 | Kim | 358/1.15 |
| 2010/0257447 A1* | 10/2010 | Kim et al. | 715/702 |
| 2012/0071149 A1* | 3/2012 | Bandyopadhyay et al. | 455/418 |

FOREIGN PATENT DOCUMENTS

| | | |
|---|---|---|
| JP | 2011-138218 | 7/2011 |
| KR | 10-2010-0035507 | 4/2010 |
| KR | 10-2010-0104171 | 9/2010 |

OTHER PUBLICATIONS

Korean Office Action issued Sep. 27, 2013 in corresponding Korean Patent Application No. 10-2012-0057386.
German Office Action mailed Jan. 14, 2013 in corresponding German Patent Application No. 102012107761.4.

* cited by examiner

*Primary Examiner* — Dorothy Harris (57) ABSTRACT

There are provided an electronic apparatus and an operating method thereof. The electronic apparatus includes: at least one mechanical button unit receiving a mechanical button input from a user; a touch screen receiving a touch input from the user; and a control unit detecting a first input signal generated from the at least one mechanical button unit to generate a first control signal and detecting a second input signal generated from the touch screen to generate a second control signal, wherein the control unit generates a third control signal different from the first control signal when the first input signal and the second input signal are simultaneously detected.

8 Claims, 8 Drawing Sheets

ELECTRONIC APPARATUS AND OPERATING METHOD THEREOF

CROSS-REFERENCE TO RELATED APPLICATIONS

This application claims the priority of Korean Patent Application No. 10-2012-0057386 filed on May 30, 2012, in the Korean Intellectual Property Office, the disclosure of which is incorporated herein by reference.

BACKGROUND OF THE INVENTION

1. Field of the Invention

The present invention relates to an electronic apparatus able to provide various convenient input methods to a user by combining a mechanical button input and a touch screen touch input and an operating method thereof.

2. Description of the Related Art

A touch sensing apparatus, such as a touch screen, a touch pad, and the like, is an input device which is attached to a display device to provide an intuitive user input method. Recently, the touch sensing apparatus has been prevalently applied to various electronic apparatuses such as mobile phones, personal digital assistants (PDAs), navigation devices, and the like. In particular, as demand for smartphones has recently increased, the use of a touch screen as a touch sensing apparatus capable of providing various input methods in a limited form factor has increased on a daily basis.

A touch screen applied to mobile devices may be largely categorized as a resistive-type touch screen and a capacitive-type touch screen according to a method of sensing a touch input thereof. With regard thereto, as the capacitive-type touch screen has a relatively long lifespan, and recognition of various input methods and gesture types can be easily implemented therein, the use thereof has increased on a daily basis. In particular, a multi touch interface can be more easily implemented in the capacitive-type touch screen than in the resistive-type touch screen, and therefore, the capacitive-type touch screen has been widely used in devices such as smartphones, and the like.

A smartphone to which a touch screen is applied generally includes an extremely limited number of mechanical buttons. Generally, a smartphone includes a screen locking/unlocking button, a volume control button, a home screen button, and the like, while the majority of other functions are controlled through touch inputs to a touch screen. Therefore, it may be very difficult for a user to select and use specific smartphone functions in a state in which a smartphone is inserted into a pouch, a bag, or the like, or the user does not look at a screen of the smartphone.

Patent Document 1 discloses a method of simultaneously detecting a touch screen input and a mechanical button input to perform an operation corresponding thereto. However, Patent Document 1 does not disclose a method of using a touch screen in a state in which a user is not viewing the touch screen. In addition, Patent Document 2 discloses a key button unit and a touch screen unit as components, but does not disclose contents in which specific functions may be executed by combining input signals from the two input units.

RELATED ART DOCUMENTS (Patent Document 1) Korean Patent Laid-Open Publication No. 10-2010-0035507

(Patent Document 2) Korean Patent Laid-Open Publication No. 10-2010-0104171

SUMMARY OF THE INVENTION

An aspect of the present invention provides an electronic apparatus capable of providing various functions by combining a touch screen touch input through a touch screen and a mechanical button input through mechanical buttons and an operating method thereof. In particular, various functions can be conveniently executed and managed in the present invention through executing specific functions by combining a touch input sensed when a touch screen is operated in a sleep period with a mechanical button input through a mechanical button even in the state in which a user does not receive direct visual conformation from devices such as a smartphone, and the like, with the naked eye.

According to an aspect of the present invention, there is provided an electronic apparatus including: at least one mechanical button unit receiving a mechanical button input from a user; a touch screen receiving a touch input from the user; and a control unit detecting a first input signal generated from the at least one mechanical button unit to generate a first control signal and detecting a second input signal generated from the touch screen to generate a second control signal, wherein the control unit generates a third control signal different from the first control signal when the first input signal and the second input signal are simultaneously detected.

The control unit may generate the third control signal when the second input signal generated from the touch screen is detected simultaneously with the first input signal during a sleep period of the touch screen.

The electronic apparatus may further include a display unit integrally provided with the touch screen and displaying an image, and the control unit may control the display unit to be off during the sleep period of the touch screen.

The control unit may simultaneously apply a predetermined driving signal to a plurality of electrodes included in the touch screen during the sleep period of the touch screen.

The control unit may only apply a predetermined driving signal to a portion of a plurality of electrodes included in the touch screen during the sleep period of the touch screen.

The control unit may detect the second input signal generated from the touch screen by the touch input including a predetermined gesture.

The control unit may detect the second input signal varied according to the predetermined gesture and generate a third input signal varied according to the detected second input signal.

According to another aspect of the present invention, there is provided a method of operating an electronic apparatus including: detecting a first input signal generated by a mechanical button input; detecting a second input signal generated by a touch input; comparing detection time of the first input signal with that of the second input signal; and generating a third control signal different from a first control signal corresponding to the first input signal when it is determined that the first input signal and the second input signal are simultaneously detected.

In the generating of the third control signal, when it is determined that the first input signal and the second input signal are detected non-simultaneously, the first control signal corresponding to the first input signal or a second control signal corresponding to the second input signal may be generated.

In the detecting of the second input signal, a change in capacitance generated by the touch input applied to a touch screen may be detected as the second input signal.

In the detecting of the second input signal, the change in capacitance generated by the touch input may be detected by applying a predetermined driving signal to only a portion of a plurality of electrodes included in the touch screen.

In the detecting of the second input signal, the change in capacitance generated by the touch input may be detected by simultaneously applying a predetermined driving signal to all of a plurality of electrodes included in the touch screen.

In the detecting of the second input signal, the second input signal generated by the touch input including a predetermined gesture may be detected.

In the detecting of the second input signal, the second input signal varied according to the predetermined gesture may be detected.

In the generating of the third control signal, a third input signal varied according to the detected second input signal may be generated.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will be described in detail with reference to the accompanying drawings. These embodiments will be described in detail in order to allow those skilled in the art to practice the present invention. It should be appreciated that various embodiments of the present invention are different but are not necessarily exclusive. For example, specific shapes, configurations, and characteristics described in an embodiment of the present invention may be implemented in another embodiment without departing from the spirit and the scope of the present invention. In addition, it should be understood that the position and arrangement of individual components in each disclosed embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings.

Hereinafter, embodiments of the present invention will be described in detail with reference to the accompanying drawings so that those skilled in the art may easily practice the present invention.

Figure 1:
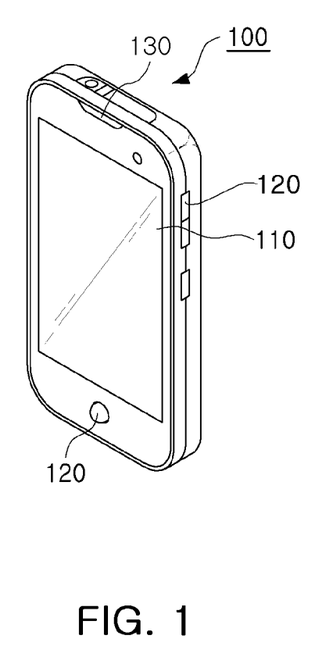
FIG. 1 is a perspective view showing an exterior of an electronic apparatus according to an embodiment of the present invention.

FIG. 1 is a view showing an electronic apparatus to which a touch sensing apparatus is applicable according to an embodiment of the present invention. Referring to FIG. 1, an electronic apparatus 100 according to the embodiment of the present invention may include a display device 110 for outputting an image, a mechanical button unit 120, an audio unit 130 for outputting audio, and the like, and may include a touch sensing apparatus integrated with the display device 110.

As shown in FIG. 1, in the case of a mobile device, the touch sensing apparatus is generally integrated with the display device and is required to have a high level of light transmittance, sufficient to transmit through an image displayed on the display device.

Therefore, the touch sensing apparatus may be implemented by forming sensing electrodes made of a material, such as indium tin oxide (ITO), indium zinc oxide (IZO), zinc oxide (ZnO), carbon nanotubes (CNTs), graphene, and the like, which has transparency and electrical conductivity, on a base substrate made of a transparent film material such as polyethylene terephthalate (PET), polycarbonate (PC), polyethersulfone (PES), polyimide (PI), and the like. A bezel area of the display device is provided with wiring patterns connected to the sensing electrodes formed of a transparent conductive material, and the wiring patterns are visually shielded by the bezel area and therefore, may be formed of a metal such as silver (Ag), copper (Cu), and the like.

In FIG. 1, the mechanical button unit 120 is depicted as a mouse apparatus disposed under the display device 110 and a volume control button disposed at a side of a housing of the electronic apparatus 100, but the present invention is not necessarily limited thereto. That is, the number of mechanical buttons may be increased or reduced beyond those shown in the embodiment shown in FIG. 1, and positions of the mechanical buttons may also be freely changed. When the user uses an input method according to the embodiment of the present invention, it may be most convenient to simultaneously apply the volume control button disposed at the side of the housing and the touch input, if the user performs an operation with one hand, but the input method is not limited to the above input method type.

Figure 2:
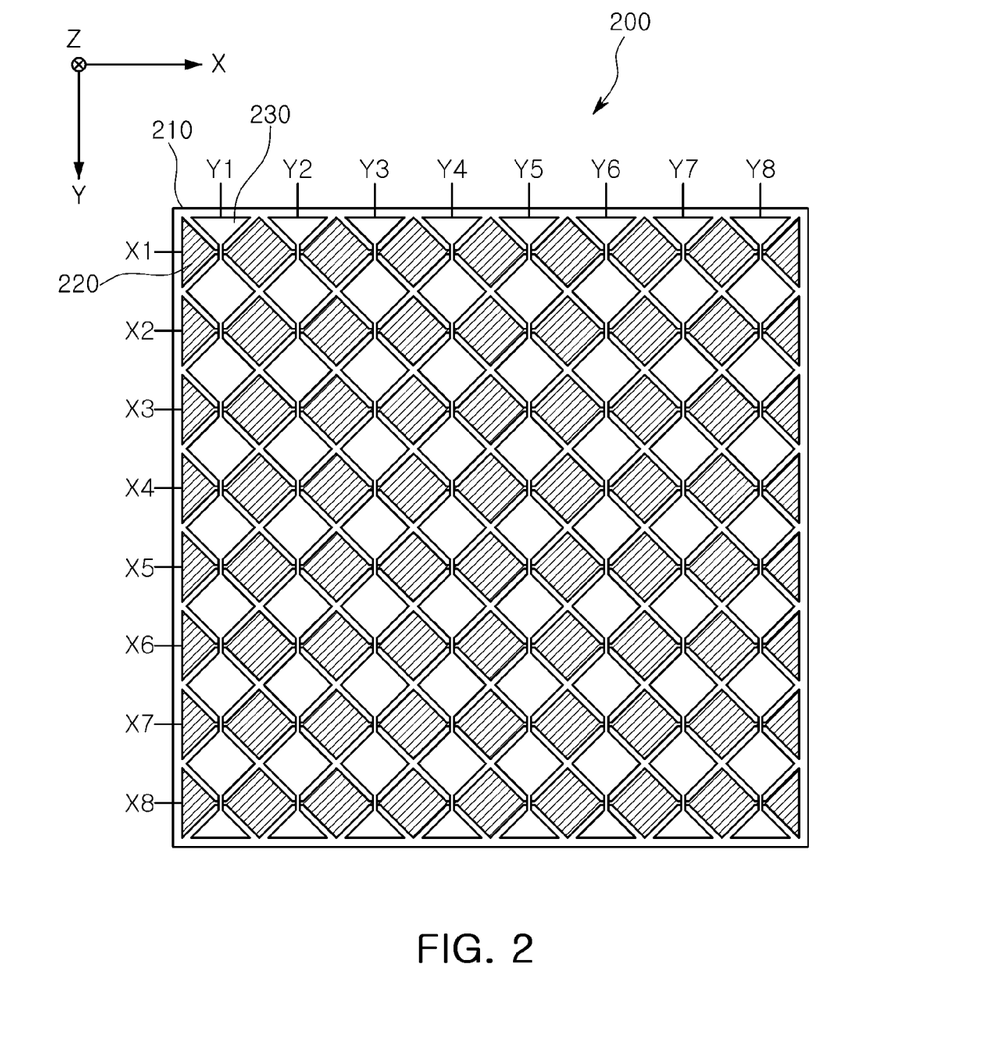
FIG. 2 is a plan view showing a touch screen included in an electronic apparatus according to an embodiment of the present invention.

FIG. 2 is a plan view showing a touch screen included in an electronic apparatus according to an embodiment of the present invention.

Referring to FIG. 2, a touch screen 200 according to the embodiment of the present invention may include a substrate 210 and a plurality of sensing electrodes 220 and 230 disposed on the substrate 210. Although not shown in FIG. 2, the plurality of sensing electrodes 220 and 230 may be electrically connected to respective wirings and wiring patterns of a circuit board attached to one end of the substrate 210 through bonding pads. A controller integrated circuit is mounted on the circuit board to detect sensing signals generated from the plurality of sensing electrodes 220 and 230 and determine the touch input.

In the case of the touch screen, the substrate 210 may be a transparent substrate on which the sensing electrodes 220 and 230 are formed, and may be formed of a plastic material, such as polyimide (PI), polymethylmethacrylate (PMMA), polyethyleneterephthalate (PET), polycarbonate (PC), and the like, or tempered glass. In addition to an area in which the sensing electrodes 220 and 230 are formed, a predetermined printing area for the wirings connected to the sensing electrodes 220 and 230 may be formed on the substrate 210 in order to visually shield the wirings formed of an opaque metal.

The plurality of sensing electrodes 220 and 230 may be disposed on one surface or both surfaces of the substrate 210 and in the case of the touch screen, may be formed of a transparent conductive material such as indium-tin-oxide (ITO), indium-zinc-oxide (IZO), zinc oxide (ZnO), carbon nanotubes (CNTs), or graphene-based material. Although the sensing electrodes 220 and 230 having a rhombus or diamond-shaped pattern are shown in FIG. 2, the sensing electrodes 220 and 230 may have various patterns using polygonal shapes such as a rectangle, a triangle, and the like.

The plurality of sensing electrodes 220 and 230 include first electrodes 220 extending in an X-axis direction and second electrodes 230 extending in a Y-axis direction. The first electrodes 220 and the second electrodes 230 may be provided on both surfaces of the substrate 210 or provided on different substrates to intersect each other. In the case in which both of the first electrodes 220 and the second electrodes 230 are disposed on one surface of the substrate 210, a predetermined insulating layer may be partially formed at intersecting points between the first electrodes 220 and the second electrodes 230.

A touch sensing apparatus that is electrically connected to the plurality of sensing electrodes 220 and 230 to sense a touch input detects capacitive variations sensed in the plurality of sensing electrodes 220 and 230 and senses the touch input therefrom. The first electrodes 220 may be connected to channels defined as D1 to D8 in the controller integrated circuit to receive a predetermined driving signal and the second electrodes 230 may be connected to channels defined as S1 to S8 to allow the touch sensing apparatus to detect a sensing signal. In this case, the controller integrated circuit may detect a change in mutual-capacitance generated between the first electrodes 220 and the second electrodes 230 as the sensing signal and sequentially apply the driving signal to the individual first electrodes 220, and simultaneously detect the change in mutual-capacitance in the second electrodes 230.

Figure 3:
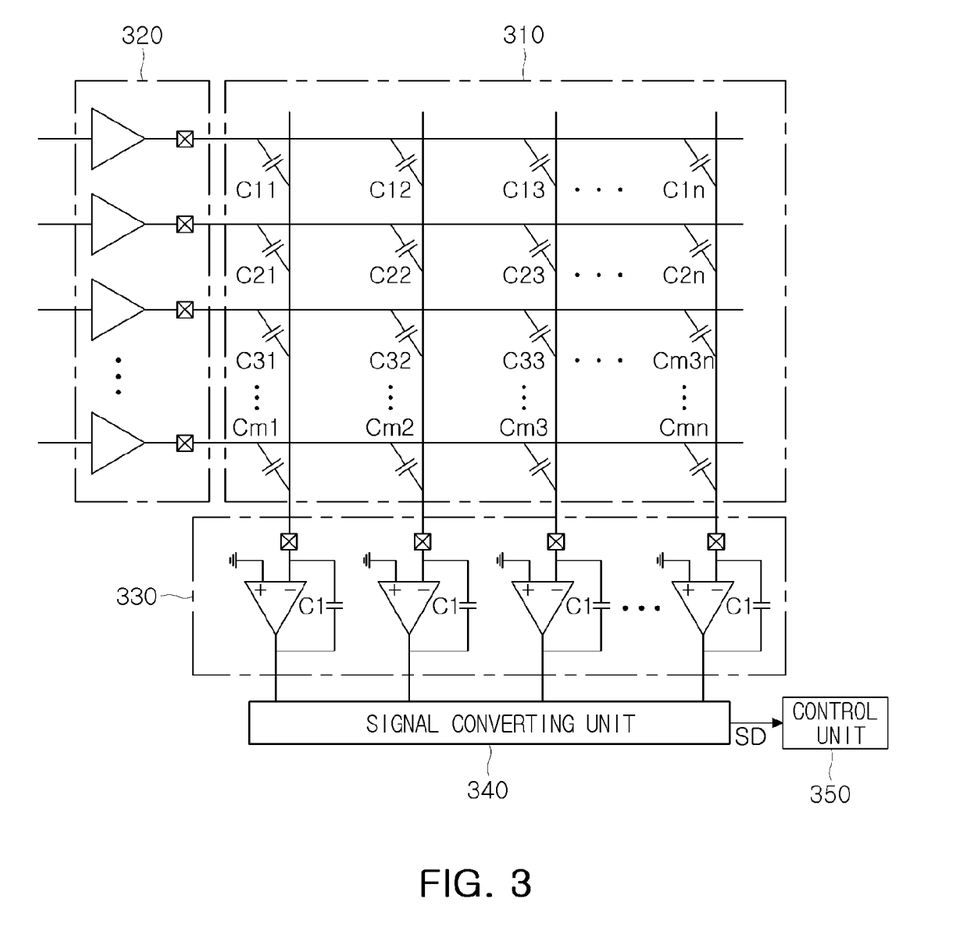
FIG. 3 is a circuit diagram showing a touch screen included in an electronic apparatus according to an embodiment of the present invention.

FIG. 3 is a circuit diagram showing a touch screen included in an electronic apparatus according to an embodiment of the present invention.

Referring to FIG. 3, a touch screen 300 according to an embodiment of the present invention includes a panel unit 310, a driving circuit unit 320, a sensing circuit unit 330, a signal converting unit 340, and a control unit 350. The panel unit 310 includes a plurality of first electrodes extending in a first-axial direction (a horizontal direction of FIG. 3) and a plurality of second electrodes extending in a second-axial direction (a vertical direction of FIG. 3) intersecting the first axis and changes in capacitance C11 to Cmn may occur in a plurality of nodes in which the first electrodes intersect the second electrodes. The changes in capacitance C11 to Cmn occurring in the plurality of nodes may be variations in mutual-capacitance generated by driving signal applied to the first electrodes by the driving circuit unit 320. Meanwhile, the driving circuit unit 320, the sensing circuit unit 330, the signal converting unit 340, and the control unit 350 may be configured as a single integrated circuit (IC).

The driving circuit unit 320 applies a predetermined driving signal to the first electrodes of the panel unit 310. The driving signal may have a square wave, a sine wave, a triangle wave, and the like, having a predetermined period and amplitude, and may be sequentially applied to the plurality of first electrodes.

FIG. 3 shows that circuits for generating and applying the driving signal are individually connected to the plurality of first electrodes, respectively; however, a single driving signal generating circuit may be used together with a switching circuit such that it may apply the driving signal to the plurality of first electrodes through the switching circuit. In addition, in the case of implementing various functions by combining a mechanical button input and a touch input as described in the embodiment of the present invention, whether the touch input is simply present or not may be detected by simultaneously applying the driving signal to all the first electrodes or selectively applying the driving signal to only a portion of the first electrodes.

The sensing circuit unit 330 may include integral circuits for sensing the change in capacitance C11 to Cm generated in the plurality of nodes, and the integral circuits may be connected to the plurality of second electrodes. The integral circuit may include at least one operational amplifier and a capacitor C1 having a predetermined capacitance. An inversion input terminal of the operational amplifier is connected to the second electrode to convert the change in capacitance C11 to Cm into an analog signal such as a voltage signal and output the signal. When the driving signal is sequentially applied to the plurality of first electrodes, the change in capacitance can simultaneously be detected from the plurality of second electrodes, and therefore, the number of integral circuits may correspond to the number (m) of the second electrodes.

The signal converting unit 340 generates a digital signal $S_D$ from the analog signal generated by the integral circuit. For example, the signal converting unit 340 may include a time-to-digital converter (TDC) circuit measuring a time required for a voltage type analog signal outputted from the sensing circuit unit 330 to reach a predetermined reference voltage level and converting the measured time into a digital signal $S_D$, or an analog-to-digital converter (ADC) circuit measuring a variation in a level of an analog signal outputted from the sensing circuit unit 330 for a predetermined time and converting the measured variation into a digital signal $S_D$. The control unit 350 determines the touch input applied to the panel unit 310 by using the digital signal $S_D$. For example, the control unit 350 may determine the number, coordinates, gestures, and the like, of the touch inputs applied to the panel unit 310.

Figure 4:
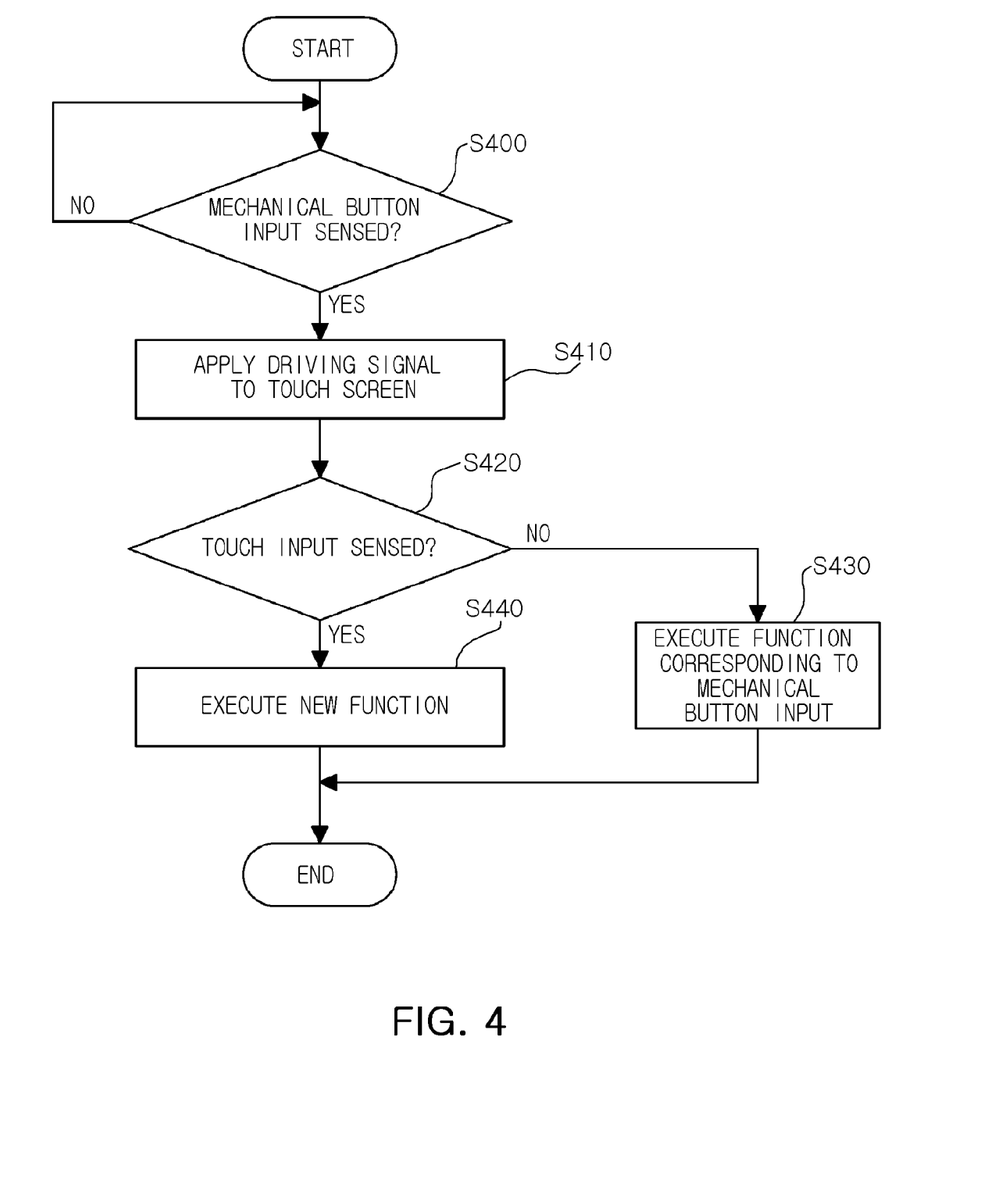
FIGS. 4 and 5 are flowcharts illustrating an operating method of an electronic apparatus according to an embodiment of the present invention.
Figure 5:
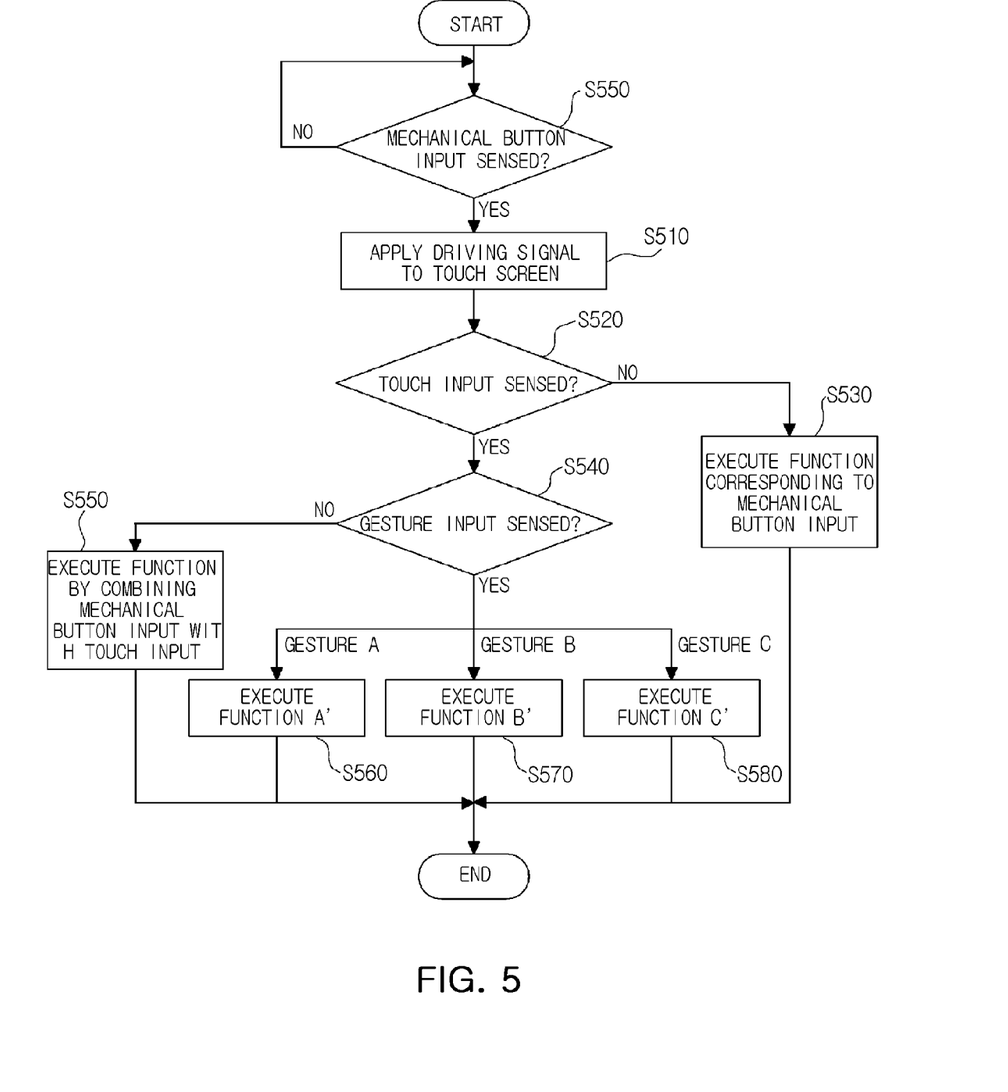

FIGS. 4 and 5 are flowcharts illustrating an operating method of an electronic apparatus according to an embodiment of the present invention.

Referring to FIG. 4, in a method of operation of the electronic apparatus 100 according to the embodiment of the present invention, it is determined whether an input through the mechanical button unit 120 is sensed (S400). When the input through the mechanical button unit 120 is not sensed in S400, the electronic apparatus 100 continuously determines whether the input through the mechanical button unit 120 is sensed. Meanwhile, when the input through the mechanical button unit 120 is sensed in S400, the electronic apparatus 100 applies a driving signal to the first electrodes of the touch screen 300 (S410).

As illustrated in FIG. 3, in the operation of the typical touch screen 300, the driving signal may be sequentially applied to the plurality of first electrodes. However, in the embodiment of the present invention, the user may use various input methods in the state in which the user does not receive direct visual confirmation from the touch screen of the electronic apparatus 100, and therefore, the method according to the embodiment of the present invention may be executed in the state in which the operation of the display device 110 is not activated.

Therefore, it may be assumed that it is difficult for the user to accurately apply the touch input to a specific position of the touch screen 300. As a result, in S410, the driving signal may be simultaneously applied to a portion of or all of the plurality of first electrodes so as to determine whether the touch input is present or not. By the above operation, power consumed by the touch screen 300 may be reduced and a response speed to the user's input may be improved.

When the driving signal is applied to the first electrodes of the touch screen 300, the control unit 350 of the touch screen 300 determines whether the touch input is sensed (S420). The touch input sensing operation of the control unit 350 is similar to that illustrated in FIG. 3. When the touch input is not sensed in S420, the electronic apparatus 100 executes a function corresponding to the mechanical button input sensed in S400 (S430). That is, a function of locking or unlocking a screen, increasing or decreasing audio output volume or moving to a home screen may be executed according to the types of mechanical button input sensed in S400.

On the other hand, when the touch input is sensed in S420, the electronic apparatus 100 executes a new function by combining the mechanical button input sensed in S400 and the touch input sensed in S420 (S440). For example, when the touch input is sensed together with the mechanical button input controlling the volume of the audio output, a function of moving currently playing music forward or backward within a play list, moving a play list itself to another play list, and the like, can be executed.

Various functions to be executed in S440 by a combination of the mechanical button input and the touch input may be appropriately customized by a user. That is, the user may previously select a function to be executed according to a specific combination of the mechanical button input and the touch input from a setting menu of the electronic apparatus 100, and the like, and conveniently input a frequently used function by the above-mentioned setting.

Next, a method of operation of the electronic apparatus 100 shown in FIG. 5 starts sensing a mechanical button input (S500), similar to the flowchart shown in FIG. 4. When the mechanical button input is not sensed, the electronic apparatus 100 continuously determines whether the mechanical button input is sensed, and when the mechanical button input is sensed, a driving signal is applied to the first electrodes of the touch screen 300 (S510).

The driving signal applying operation S510 may be performed by simultaneously applying the driving signal to only a portion of or all of the first electrodes, similar to FIG. 4. By applying the driving signal in the above-described scheme, whether the touch input is present or not may be determined, and response speed to the input may be increased while power consumed by the touch screen 300 may be reduced. The control unit 350 of the touch screen 300 determines whether the touch input is sensed (S520).

As the determination result in S520, when the touch input is not sensed, the electronic apparatus 100 executes a function corresponding to the mechanical button input sensed in S500 (S530). On the other hand, when the touch input is sensed in S520, the electronic apparatus 100 determines whether the sensed touch input is a simple touch input or a touch input including a gesture (S540). The gesture may be various gestures, such as flick, rotate, panning, drag, double tap, hopping, and the like.

As the determination result in S540, when it is determined that the touch input sensed in S520 is a simple touch input that does not include any gesture, the electronic apparatus 100 executes a function by combining the mechanical button input with the touch input (S550). As illustrated in FIG. 4, when the touch input is sensed together with the mechanical button input controlling the volume of the audio output, the electronic apparatus 100 may serve to move currently playing music forward or backward within a play list, move a play list itself to another play list, and the like.

Meanwhile, as the determination result in S540, when it is determined that the touch input sensed in S520 includes the gestures, different functions are executed according to the gestures included in the touch input (S560 to S580). For example, when it is determined that a gesture A is included in the touch input, a function corresponding to A' is executed by combining the mechanical button input sensed in S500 with the gesture A (S560). Describing in detail, when the mechanical button controlling the volume of the audio output and a drag input corresponding to a major-axis direction (generally, a vertical direction) of the display device 110 are simultaneously sensed, the volume of the audio output may be finely increased or decreased. In addition, when a circular rotating gesture input and a screen locking and unlocking mechanical button input are simultaneously sensed, an operation of automatically rebooting the electronic apparatus 100 may be executed.

In addition, when a gesture B is included in the touch input, a function corresponding to B' may be executed by combining the mechanical button input sensed in S500 with the gesture B (S570) and when it is determined that the touch input includes a gesture C, a function corresponding to C' may be executed by the mechanical button input with the gesture C (S580). In this case, A, B, and C can be defined as different gestures and as a result, executed functions A', B', and C' may also be different functions. Therefore, even in an electronic apparatus including only an extremely small number of mechanical buttons, a convenient user interface may be implemented by combining various gesture inputs with mechanical button input.

Figure 6:
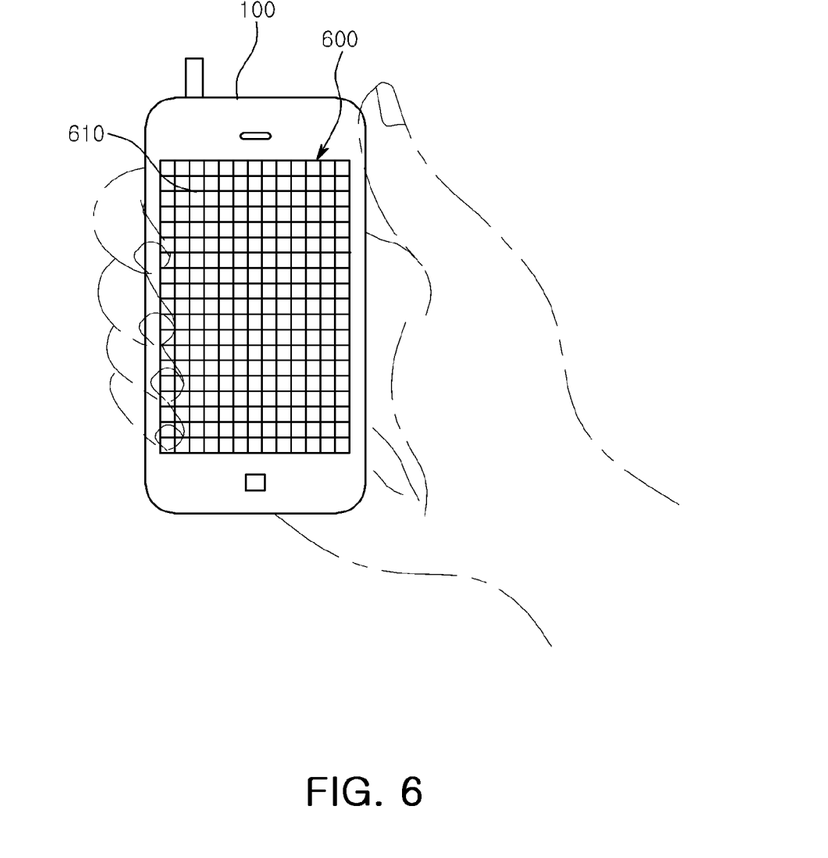
FIGS. 6 to 8 are diagrams illustrating an operating method of an electronic apparatus according to an embodiment of the present invention.
Figure 7:
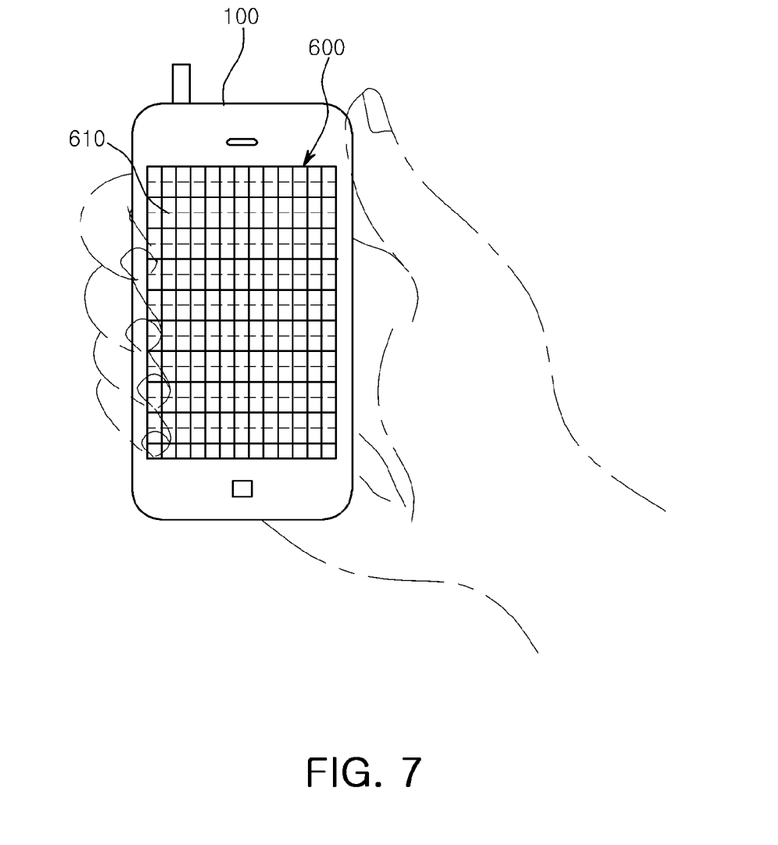
Figure 8:
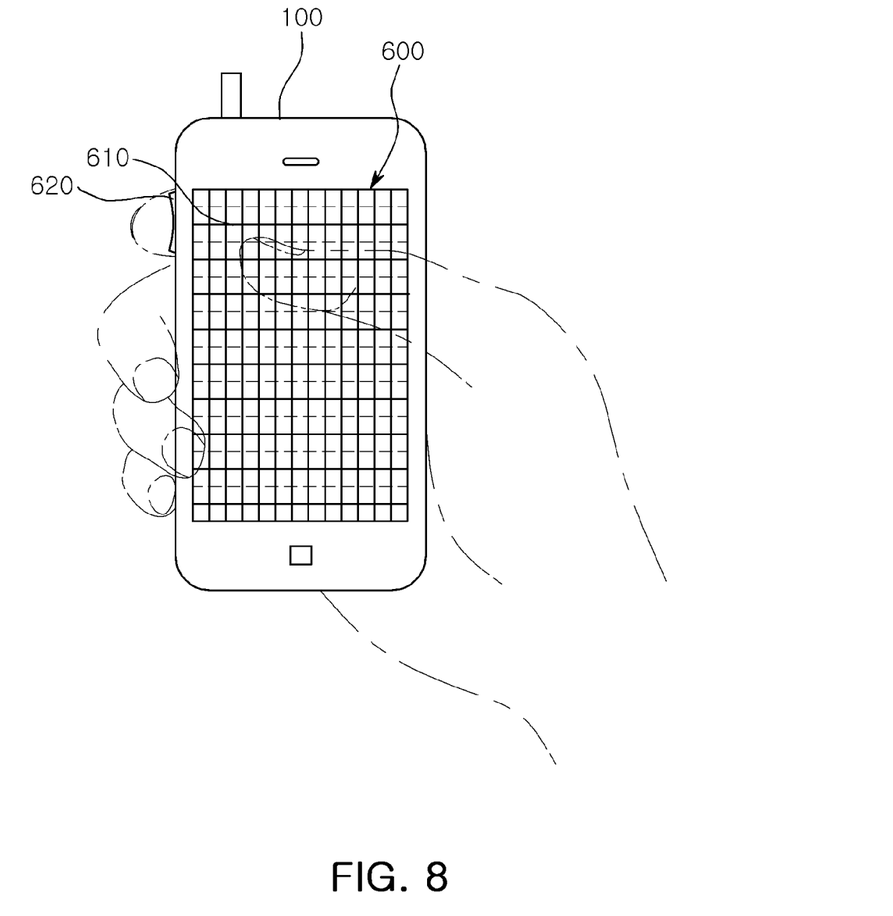

FIGS. 6 to 8 are diagrams illustrating an operating method of an electronic apparatus according to an embodiment of the present invention.

Referring to FIG. 6, a driving signal is simultaneously applied to a plurality of first electrodes 610 included in a touch screen 600. In this case, in order to increase the response speed to the input, the driving signal may be simultaneously applied to all the first electrodes 610. When the driving signal is simultaneously applied to all the first electrodes 610, it may be difficult to determine accurate coordinates of the touch input, but it may be determined whether the touch input is present. Therefore, when a user intends to execute a specific function by combining a touch input with a mechanical button input without visual conformation of the electronic apparatus 100 with the naked eye, the touch screen 600 may be operated by simultaneously applying the driving signal to all the first electrodes 610.

Meanwhile, referring to FIG. 7, a driving signal is applied to only at least a portion of the plurality of first electrodes 610 included in the touch screen 600. For example, when it is assumed that a total m of the first electrodes 610 are present, the driving signal may be selectively applied to only odd-numbered first electrodes 610. In this case, in order to determine whether the touch input includes gestures, the driving signal may be sequentially applied to each of the odd-numbered first electrodes 610. By applying the driving signal to only the selected first electrodes 610, the power consumed by the touch screen 600 may be reduced while the response speed to the input may be increased.

FIG. 8 is a diagram showing a case in which a specific function is executed by simultaneously sensing a touch input and a mechanical button input that are applied to the touch screen 600. As shown in FIG. 8, a user holds the electronic apparatus 100 with one hand and applies a touch input to the touch screen 600 with the thumb and presses a mechanical button disposed at the side of the electronic apparatus 100, and the like, with other fingers, thereby simultaneously generating the touch input and the mechanical button input.

In the embodiment of FIG. 8, the power consumption may be reduced and the response speed to the input may be increased by selectively applying a driving signal to only a portion of the plurality of first electrodes 610 included in the touch screen 600. In addition, when the touch input applied to the touch screen 600 is simply determined as only the presence/absence of the touch input, the screen of the display device is maintained in a locking state, thereby reducing power consumption. As illustrated in the flowchart of FIG. 5, when touch inputs including various gestures are applied, the functions corresponding to respective gestures may be executed.

As set forth above, according to embodiments of the present invention, various functions can be implemented according to a combination of input signals, according to whether a touch input through the touch screen and a mechanical button input through a mechanical button are simultaneously detected. In particular, various functions can be selected and executed by combining a touch input applied in a sleep period of a touch screen with a mechanical button input even in a state in which a user does not receive direct visual conformation from a mobile device such as a smartphone, and the like, with the naked eye.

While the present invention has been shown and described in connection with the embodiments, it will be apparent to those skilled in the art that modifications and variations can be made without departing from the spirit and scope of the invention as defined by the appended claims.

What is claimed is:

1. An electronic apparatus, comprising: at least one mechanical button unit receiving a mechanical button input from a user;
   a touch screen receiving a touch input from the user; and
   a control unit detecting a first input signal generated from the at least one mechanical button unit to generate a first control signal and detecting a second input signal generated from the touch screen to generate a second control signal,
   the control unit generates a third control signal different from the first control signal when the first input signal and the second input signal are simultaneously detected,
   the control unit generates the third control signal when the second input signal generated from the touch screen is detected simultaneously with the first input signal in a state in which operation of a display unit is not activated,
   the control unit detects the second input signal generated from the touch screen by the touch input including a predetermined gesture,
   the control unit detects the second input signal varied according to the predetermined gesture and selects at least one function of a plurality of functions according to the detected second input signal,
   wherein the display unit is integrally provided with the touch screen to display an image, and
   wherein the control unit controls the display unit to be off in the state in which operation of the display unit is not activated.

2. The electronic apparatus of claim 1, wherein the control unit simultaneously applies a predetermined driving signal to a plurality of electrodes included in the touch screen in the state in which operation of the display unit is not activated.

3. The electronic apparatus of claim 1, wherein the control unit only applies a predetermined driving signal to a portion of a plurality of electrodes included in the touch screen in the state in which operation of the display unit is not activated.

4. A method of operating an electronic apparatus, the method comprising: detecting a first input signal generated by a mechanical button input;
   detecting a second input signal generated by a touch input on a touch screen integrally provided with a display unit to display an image;
   comparing detection time of the first input signal with that of the second input signal; and
   generating a third control signal different from a first control signal corresponding to the first input signal when it is determined that the first input signal and the second input signal are simultaneously detected,
   the generating of the third control signal further includes generating the third control signal when the second input signal generated from the touch screen is detected simultaneously with the first input signal during a state in which operation of the display unit is not activated,
   the detecting of the second input signal further includes detecting the second input signal generated by the touch input which includes a predetermined gesture which is detected,
   the detecting of the second input signal further includes detecting the second input signal which is varied according to the detected predetermined gesture,
   the generating of the third control signal further includes selecting at least one function of a plurality of functions according to the detected second input signal, and
   wherein the control unit controls the display unit to be off in the state in which operation of the display unit is not activated.

5. The method of claim 4, wherein, in the generating of the third control signal, when it is determined that the first input signal and the second input signal are detected non-simultaneously, the first control signal corresponding to the first input signal or a second control signal corresponding to the second input signal is generated.

6. The method of claim 4, wherein, in the detecting of the second input signal, a change in capacitance generated by the touch input applied to a touch screen is detected as the second input signal.

7. The method of claim 6, wherein, in the detecting of the second input signal, the change in capacitance generated by the touch input is detected by applying a predetermined driving signal to only a portion of a plurality of electrodes included in the touch screen.

8. The method of claim 6, wherein, in the detecting of the second input signal, the change in capacitance generated by the touch input is detected by simultaneously applying a predetermined driving signal to all of a plurality of electrodes included in the touch screen.

* * * * *